(12) United States Patent
Croy et al.

(10) Patent No.: US 9,510,145 B2
(45) Date of Patent: Nov. 29, 2016

(54) BATTERY-SAVING IN GEO-FENCE CONTEXT METHOD AND SYSTEM

(71) Applicant: POINT INSIDE, INC., Bellevue, WA (US)

(72) Inventors: Jonathan A. Croy, Seattle, WA (US); Joshua L. Marti, Bellevue, WA (US); Steighton Lee Haley, Seattle, WA (US)

(73) Assignee: POINT INSIDE, INC., Bellevue, WA (US)

(*) Notice: Subject to any disclaimer, the term of this patent is extended or adjusted under 35 U.S.C. 154(b) by 588 days.

(21) Appl. No.: 13/842,402

(22) Filed: Mar. 15, 2013

(65) Prior Publication Data

US 2013/0217411 A1   Aug. 22, 2013
US 2016/0212583 A9   Jul. 21, 2016

Related U.S. Application Data

(63) Continuation-in-part of application No. 13/656,566, filed on Oct. 19, 2012, now abandoned.

(60) Provisional application No. 61/550,283, filed on Oct. 21, 2011.

(51) Int. Cl.
 *H04W 4/02* (2009.01)

(52) U.S. Cl.
 CPC .................................. *H04W 4/021* (2013.01)

(58) Field of Classification Search
 CPC ....... G01C 21/10; H04W 4/02; H04W 4/021
 See application file for complete search history.

(56) References Cited

U.S. PATENT DOCUMENTS

| 8,661,121 | B1* | 2/2014 | Mendis .......................... 709/224 |
| 2002/0013153 | A1* | 1/2002 | Wilcock ................ G01S 5/0226 455/456.3 |
| 2014/0156410 | A1* | 6/2014 | Wuersch et al. ........... 705/14.58 |

* cited by examiner

*Primary Examiner* — Michael D Lang
(74) *Attorney, Agent, or Firm* — Schwabe, Williamson & Wyatt, P.C.

(57) ABSTRACT

While traveling to a destination, potentially traversing geo-fences along the way, a routine on a mobile device estimates arrival at the next geo-fence and performs a location check at the estimated arrival time. Between iterations of this process, the routine may correct the "time of next check" based on correction factors. When the mobile device arrives at the destination, it switches to terrestrial location determining services. In addition, the mobile device monitors its sensors to determine whether motion is gross motion which may warrant performing a location probe or whether motion is not gross motion, in which case location probes may be disabled.

20 Claims, 7 Drawing Sheets

BATTERY-SAVING IN GEO-FENCE CONTEXT METHOD AND SYSTEM

RELATED APPLICATIONS

This application is a continuation-in-part of application Ser. No. 13/656,566, filed Oct. 19, 2012, titled, "Optimizing the Relevance of Mobile Content Based on User Behavioral Patterns," which application claims the benefit of application Ser. No. 61/550,283, filed Oct. 21, 2011, titled, "Optimizing the Relevance of Mobile Content Based on User Behavioral Patterns," which applications are incorporated into this application by this reference.

FIELD

This disclosure relates to geo-fence techniques practiced by mobile computing devices.

BACKGROUND

The following description includes information that may be useful in understanding the present invention. It is not an admission that any of the information provided herein is prior art or relevant to the presently claimed invention, or that any publication specifically or implicitly referenced is prior art.

Monitoring the location of a mobile device is essential to many contemporary location aware services, such as services in which movement of a mobile device relative to a destination is monitored.

However, particularly when practiced by a mobile device, monitoring the location of the mobile device requires energy expenditures by the mobile device, which expenditures may cause the mobile device to need to be recharged. The energy expenditures are caused by, for example, receiving and processing GPS signals or sending and receiving signals from terrestrial location services as the mobile device transits relative to the destination. Monitoring the location of the mobile device, whether performed by the mobile device or a server (or servers), may also result in overly-frequent updating of the mobile device location, which, potentially in conjunction with errors in the determined mobile device location, may result in an unnecessary power utilization by the mobile device as well as irregularities in the charted of the path of the mobile device.

DETAILED DESCRIPTION

Figure 1:
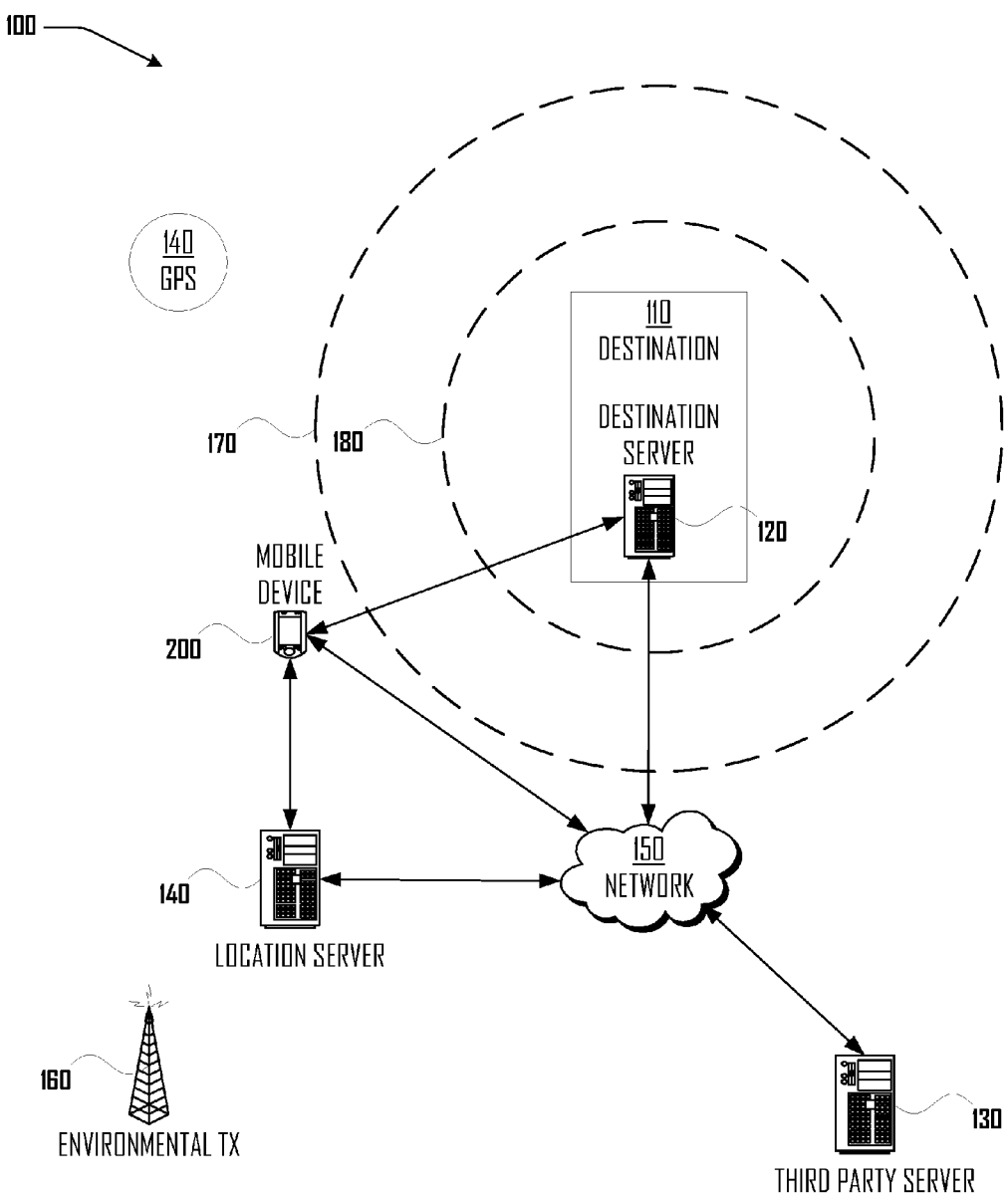
FIG. 1 is a network and device diagram illustrating exemplary devices configured according to embodiments disclosed in this paper.

The following Detailed Description provides specific details for an understanding of various examples of the technology. One skilled in the art will understand that the technology may be practiced without many of these details. In some instances, structures and functions have not been shown or described in detail or at all to avoid unnecessarily obscuring the description of the examples of the technology. It is intended that the terminology used in the description presented below be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the term "connected," "coupled," or any variant thereof means any connection or coupling, either direct or indirect between two or more elements; the coupling of connection between the elements can be physical, logical, or a combination thereof. Additionally, the words, "herein," "above," "below," and words of similar import, when used in this application, shall refer to this application as a whole and not to particular portions of this application. When the context permits, words using the singular may also include the plural while words using the plural may also include the singular. The word "or," in reference to a list of two or more items, covers all of the following interpretations of the word: any of the items in the list, all of the items in the list, and any combination of one or more of the items in the list.

Certain elements appear in various of the Figures with the same capitalized element text, but a different element number. When referred to herein with the capitalized element text but with no element number, these references should be understood to be largely equivalent and to refer to any of the elements with the same capitalized element text, though potentially with differences based on the computing device within which the various embodiments of the element appears.

As used herein, a geo-fence is a perimeter, zone, or area relative to a geographic destination. The geo-fence may be represented by a physical object, such as a fence, gate or similar, though the geo-fence may also or alternatively be non-physical, such as a distance from a destination, a set of coordinates, and/or a boundary at which radio reception or radio communication becomes possible. A geo-fence may be at the destination (the destination, itself, may be a geo-fence) or may be external to the destination. As discussed herein, geo-fencing is a practice in which either i) a mobile device has a destination and monitors the movement of the mobile device relative to a) the destination and/or b) geo-fences between the mobile device and the destination or ii) a destination or a location service monitors the movement of mobile devices relative to geo-fences external to and including the destination.

FIG. 1 is a network and device diagram illustrating exemplary devices configured according to embodiments disclosed in this paper. In FIG. 1, a Mobile Device 200 is illustrated as connecting to a Network 150, such as the Internet (which connection may be via a Wi-Fi connection), and/or to a wireless network, such as a GSM, TDMA, CDMA, EDGE, HSPA, LTE or other network provided by a wireless service provider. Examples of Mobile Devices include smart phones, tablet computers, laptop computers, e-readers, personal computers and similar computing devices. Mobile Devices are used by "users." Also illustrated as connecting to the Network 150 and/or to the Mobile Device 200 are a Destination Server 120, a Location Server 140, and a Third Party Server 130.

Connection to the Network 150 or direct connection between computing devices may require that the computers execute software routines which enable, for example, the seven layers of the OSI model of computer networking or equivalent in a wireless phone network. The Network 150 comprises computers, network connections among the computers, and software routines to enable communication between the computers over the network connections.

The Destination 110 illustrated in FIG. 1 may be a destination toward which the user of the Mobile Device 200 may be traveling. The Destination 110 may be located at geospatial coordinates (lat./long., an address, or similar), which coordinates may be entered by the user of the Mobile Device 200, or by a routine executed by the Mobile Device 200, or by a third party, into the Mobile Device 200; in any case, the Destination 110 may be saved as the Destination 315 record in the Mobile Device Datastore 300. The Destination Server 120 may be a computer located at the Destination 110 (or, similarly, a remote computer with access to computers or computer equipment at the Destination, such as a Wi-Fi base station).

Also illustrated in FIG. 1 are Geo-Fence 170 and Geo-Fence 180. These Geo-Fences are illustrated as circles centered on the Destination 110, though in practice the boundary of the Geo-Fences may not be continuous, regular, or stationary. The Mobile Device 200 may move relative to the Destination 110 and the Geo-Fences. The Mobile Device 200 may comprise a Mobile Device Datastore 300 comprising records, such as Geo-Fence Location 330, which records comprise the location of a Geo-Fence. The location of a Geo-Fence as recorded in the Geo-Fence Location 330 record may, for example, be a location along a route (such as latitude and longitude coordinates on a route which the Mobile Device 200 is traveling, such as Route 365), a location or area in geospatial coordinates (such as one of the Geo-Fence circles illustrated in FIG. 1), or a conditional identifier, such as an indication that a Geo-Fence is encountered or crossed when radio-frequency energy from an Environmental TX 160 is detected.

The Environmental TX 160 illustrated in FIG. 1 may be an emitter of radio-frequency energy, such as, for example, a television or radio transmitter, a Wi-Fi base station, a cellular telephone base station, or similar. The Environmental TX 160 may emit radio-frequency energy containing information which identifies the Environmental TX 160. The Mobile Device 200 may comprise a Mobile Device Datastore 300 comprising records, such as TX-Emitter Coordinates 355, which records associate radio-frequency energy received by the Mobile Device 200 with a location of one or more Environmental TX 160 entities.

The Location Server 140 may be a computer which provides location-based or location aware services, such as services which identify the location of the Mobile Device 200, the location of the Destination 110, the Destination Server 120, and which may process such location(s) in conjunction with other services, such as, for example, Content services. For example, the Location Server 140 may identify the location of the Mobile Device 200, may communicate this information to Mobile Device 200 and/or to the Third Party Server 130, which Third Party Server 130 may then serve Content to the Mobile Device 200 based on the location of the Mobile Device 200. The Location Server 140 is illustrated as separate and remote from the Destination 110, the Destination Server 120, and the Third Party Server 130, though the Location Server 140 may be one (or more) of these computing devices and may, for example, be located at the Destination 110.

As used herein, "Content" comprises webpages, equivalent interactive user interfaces found in applications executed by the Mobile Device, non-interactive media provided by radio, television, and other media comprising text, audio, images, video, and/or interactive, graphical and formatting elements. Content may be provided by, for example, Third Party Server 130 and/or Environmental TX 160 (as well as found on billboards, magazines, etc.).

Connection by the Mobile Device 200 to the other computers illustrated in FIG. 1 (such as to the Destination Server 120, the Location Server 140, the Third Party Server 130 or to other computers not illustrated in FIG. 1) may require that the Mobile Device 200 have an account in a routine executed by (or under the direction of) such other computer. Creation of an account at the other computer may involve the Mobile Device 200 providing the other computer with the credentials used by the Mobile Device 200 to authenticate and authorize with the routine executed by the other computer, which credentials or a token representing the same may be provided to login to the account at the other computer.

Figure 2:
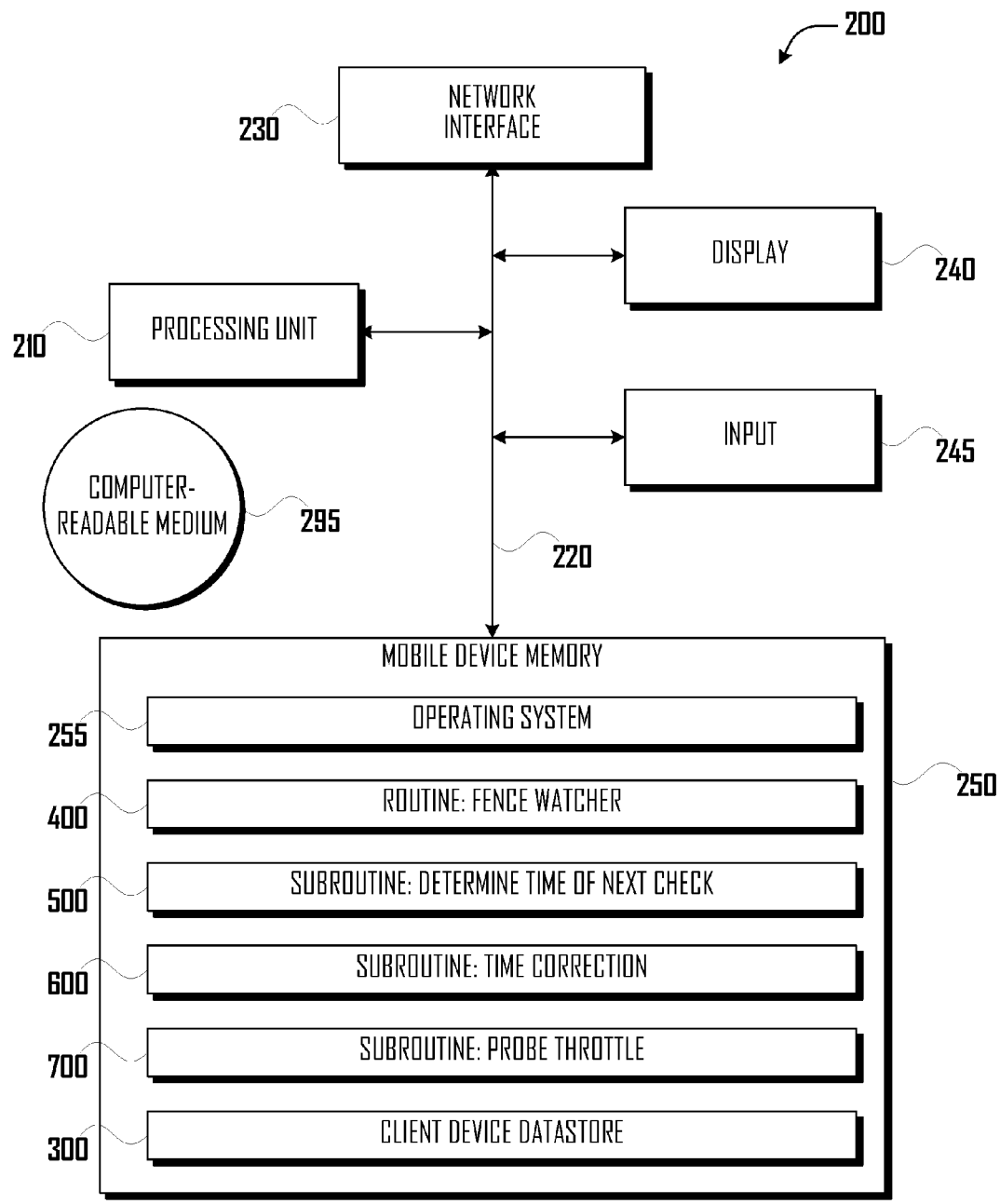
FIG. 2 is a functional block diagram of an exemplary Mobile Device computing device and some data structures and/or components thereof.

The computers illustrated in FIG. 1 other than the Mobile Device 200 are generally similar to the Mobile Device 200 in terms of the illustration of components found in and discussed in relationship to FIG. 2. The discussion herein primarily is addressed to execution of certain routines by the Mobile Device 200. It would be understood that one or more of these routines or subroutines therein may be executed by a computer remote from the Mobile Device 200, such as by the Location Server 140, with, for example, a result thereof being passed back to the Mobile Device 200 for further processing.

This paper may discuss a first computer as connecting to a second computer (such as a Mobile Device connecting to the Location Server 140) or to a corresponding datastore (such as a datastore in the Location Server 140); it should be understood that such connections may be to, through, or via the other of the two components (for example, a statement that a computing device connects with or sends data to the Mobile Device 200 should be understood as saying that the computing device may connect with or send data to Mobile Device Datastore 300). References herein to "database" should be understood as equivalent to "Datastore." Although illustrated as components integrated in one physical unit, the servers and databases may be provided by common (or separate) physical hardware and common (or separate) logic processors and memory components.

Figure 4:
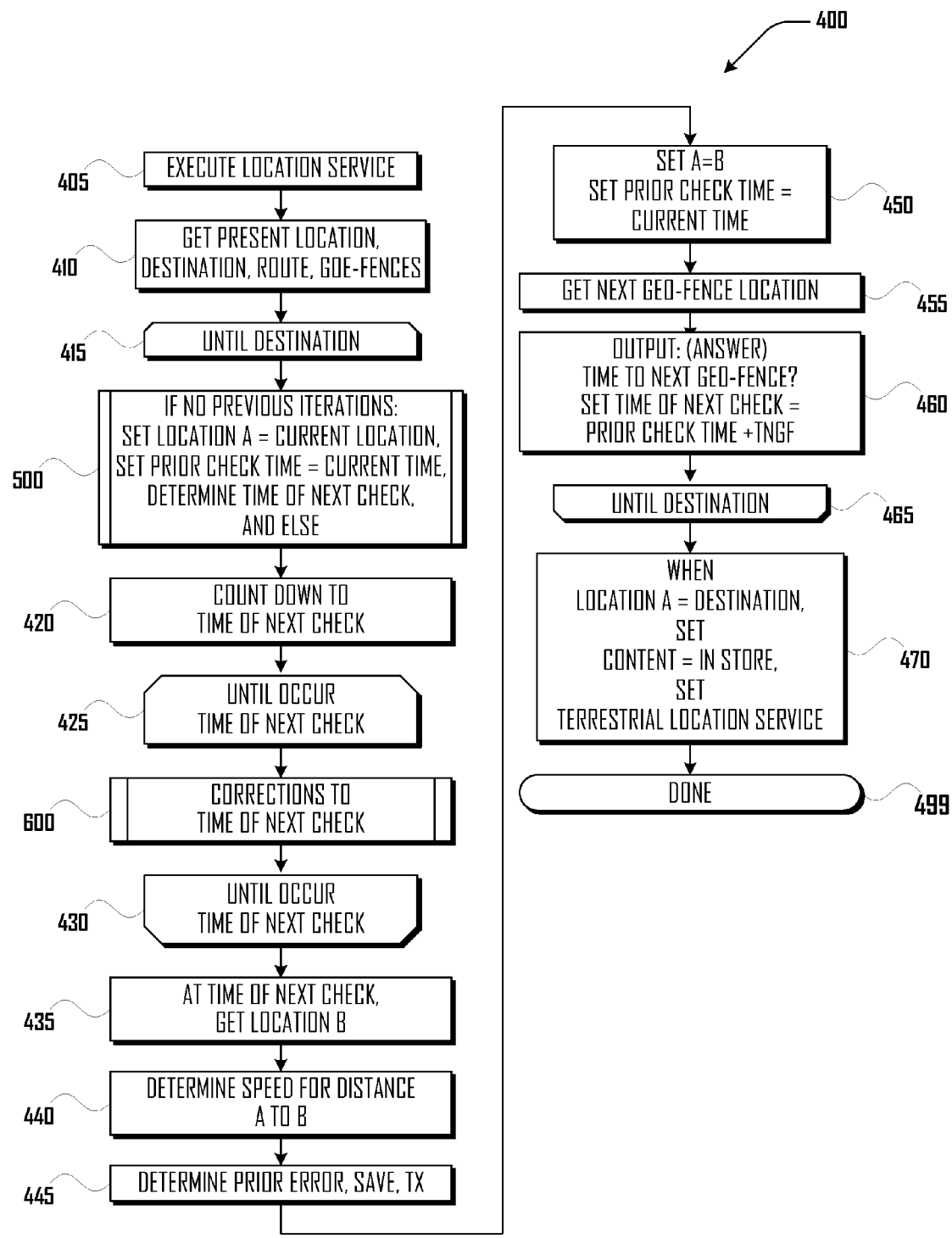
FIG. 4 is a flowchart illustrating a routine practiced by a Geo-Fence Watcher process.

As discussed further herein, while traveling from a current location to a Destination, potentially traversing Geo-Fences along the way and while executing a location service, the Mobile Device 200 executes the Fence Watcher 400 routine, outlined in FIG. 4, to throttle the rate at which the Mobile Device 200 performs location checks. The Fence Watcher 400 routine estimates the arrival of the Mobile Device 200 at the next Geo-Fence (which may be a Destination 110) and instructs the Mobile Device 200 to perform a next location check accordingly, at the "time of next check." Between checks, the routine may correct the "time of next check" based on correction factors such as an uncertainty factor derived from the mobile device's own history and the history of other mobile devices 200, such as based on data from sensors in the Mobile Device 200 (such as data from accelerometers). When the Mobile Device 200 has been determined to have arrived at, proximate to (such as within a Geo-Fence relative to a Destination 110), or in a Destination, the Mobile Device 200 may be instructed by the Fence Watcher 400 routine to switch from GPS-based location determination to a Terrestrial Location Determining Service.

Figure 7:
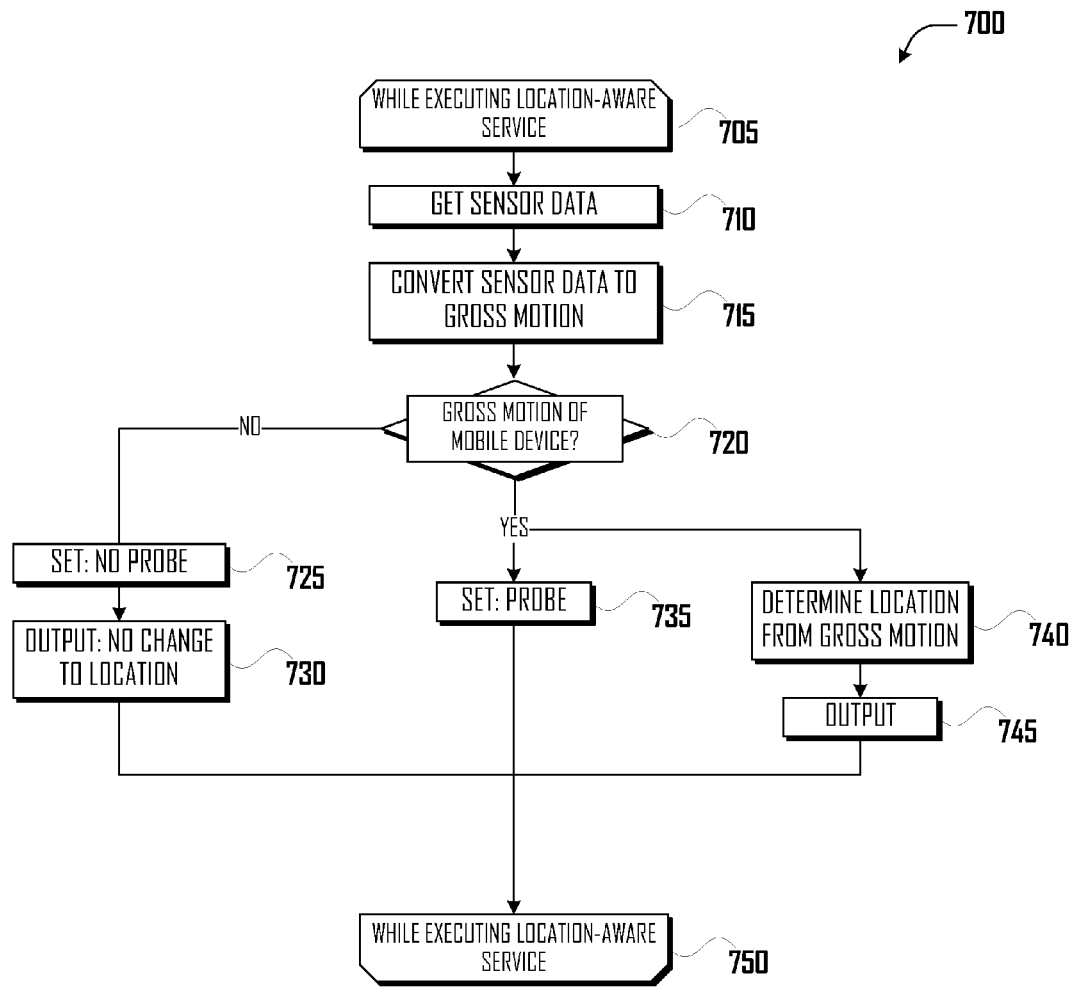
FIG. 7 is a flowchart illustrating a subroutine of a Probe Throttle process, practiced while another location aware routine is being executed.

The Probe Throttle 700 routine outlined in FIG. 7 causes a Mobile Device 200 to utilize sensor data to determine whether the Mobile Device 200 is moving in conjunction with gross motion of the user of the Mobile Device 200 or whether the Mobile Device 200 is moving independent of gross motion of the user (such as when the user may be stationary, but is swinging an arm which is holding the Mobile Device 200). When not engaged in gross motion, the Probe Throttle 700 routine may reduce the rate at which the Mobile Device 200 probes its location.

FIG. 2 is a functional block diagram of an exemplary Mobile Device computing device and some data structures and/or components thereof. The computing device 200 in FIG. 2 comprises at least one Processing Unit 210, Mobile Device Memory 250, and a Display 240, all interconnected along with the Network Interface 230 via a Bus 220. The Network Interface 230 may be utilized to form connections with the Network 150 and to send and receive radio frequency ("RF") and other wireless signals (to the extent not included in the Input 245). The Mobile Device Memory 250 generally comprises a random access memory ("RAM"), a read only memory ("ROM"), and a permanent mass storage device, such as a disk drive or SDRAM (synchronous dynamic random-access memory). The Mobile Device Memory 250 stores program code for software routines, such as, for example, the Fence Watcher 400 routine, the Determine Time of Next Check 500 routine, the Time Correction 600 routine, and the Probe Throttle 700 routine, as well as browser, webserver, email client and server routines, camera, gesture and glance watching applications, other client applications, and database applications. In addition, the Mobile Device Memory 250 also stores an Operating System 255. These software components may be loaded from a non-transient Computer Readable Storage Medium 295 into Mobile Device Memory 250 of the computing device using a drive mechanism (not shown) associated with a non-transient Computer Readable Storage Medium 295, such as a floppy disc, tape, DVD/CD-ROM drive, memory card, or other like storage medium. In some embodiments, software components may also or instead be loaded via a mechanism other than a drive mechanism and Computer Readable Storage Medium 295 (e.g., via Network Interface 230).

The computing device 200 may also comprise hardware supported input modalities, Input 245, such as, for example, a touchscreen, a keyboard, a mouse, a trackball, a stylus, a microphone, accelerometer(s), compass(es), RF receivers (to the extent not part of the Network Interface 230), and a camera, all in conjunction with corresponding routines.

Figure 3:
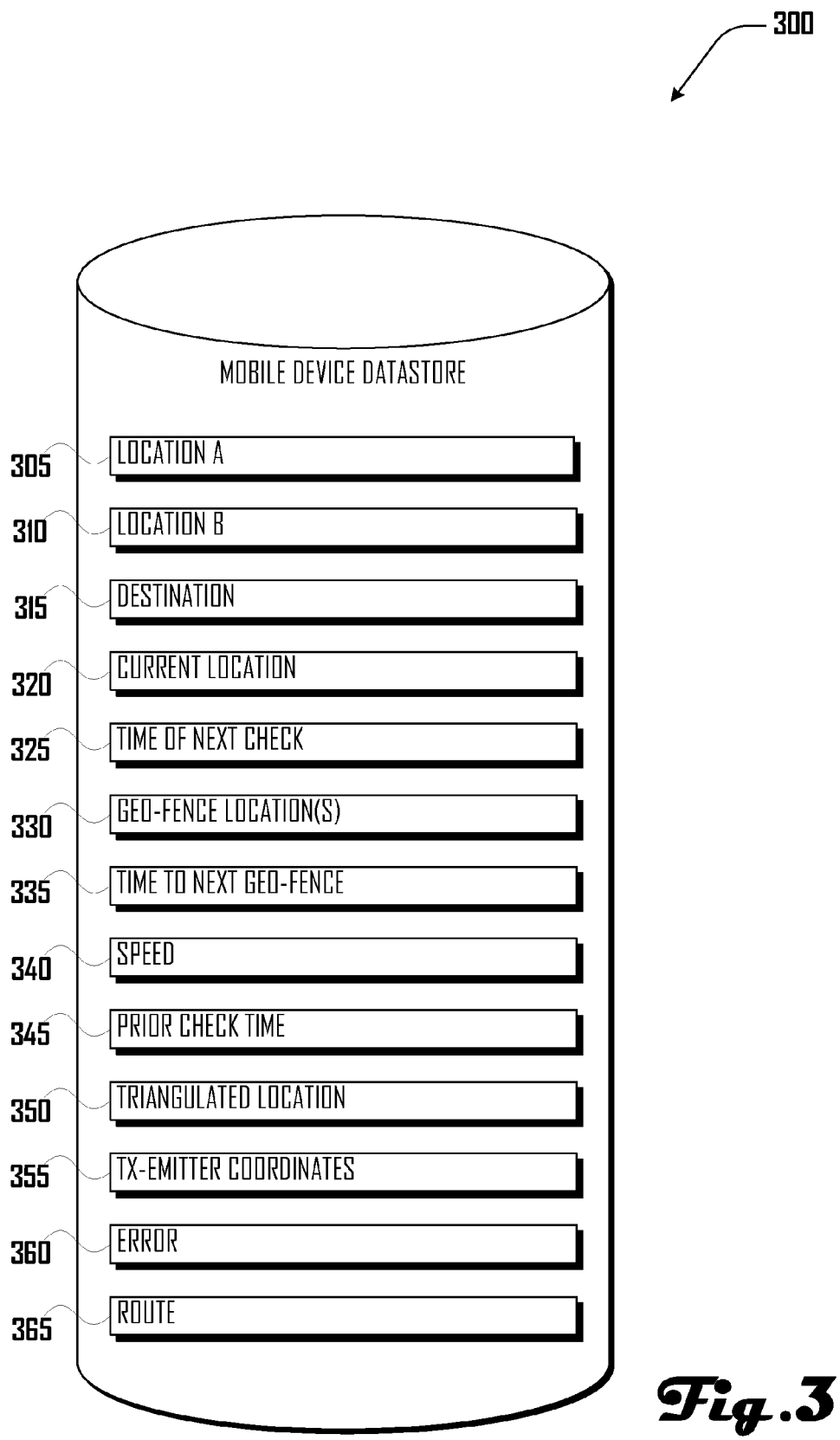
FIG. 3 is a functional block diagram of the Mobile Device Datastore illustrated in the computing device of FIG. 2.

The Mobile Device 200 may also comprise or communicate via Bus 220 with Mobile Device Datastore 300, illustrated further in FIG. 3. In various embodiments, Bus 220 may comprise a storage area network ("SAN"), a high speed serial bus, and/or via other suitable communication technology. In some embodiments, Mobile Device 200 may communicate with the Mobile Device Datastore via Network Interface 230. The Mobile Device 200 may, in some embodiments, include many more components than those shown in this Figure. However, it is not necessary that all of these generally conventional components be shown in order to disclose an illustrative embodiment.

The Mobile Device 200 is illustrated in FIG. 2 as comprising data groups for routines, such as routines for the Fence Watcher 400 routine, the Determine Time of Next Check 500 routine, the Time Correction 600 routine, and the Probe Throttle 700 routine. The Fence Watcher 400 routine is a software routine which reduces energy utilization by the Mobile Device 200 while monitoring the movement of the Mobile Device 200 relative to a destination, such as Destination 110, and/or relative to Geo-Fences associated with the Destination. The Determine Time of Next Check 500 routine is a subroutine executed within the Fence Watcher 400 routine, which subroutine determines when to obtain the location of the Mobile Device 200. The Time Correction 600 routine is a subroutine executed within the Fence Watcher 400 routine, which subroutine applies corrections to the time to obtain the location of the Mobile Device 200.

Additional data groups for routines, such as for a webserver and web browser, may also be present on and executed by the Mobile Device 200. Browser routines may provide an interface for interacting with the other computing devices illustrated in FIG. 1, such as with the Location Server 140 and the Third Party Server 130, for example, through webserver and web browser routines (which may serve and respond to data and information in the form of webpages and html documents or files). The browsers and webservers are meant to illustrate user-interface and user-interface enabling routines generally, and may be replaced by equivalent routines for serving and rendering information to and in a user interface in a computing device (whether in a web browser or in, for example, a mobile device application).

FIG. 3 is a functional block diagram of the Mobile Device Datastore illustrated in the computing device of FIG. 2. The components of the Mobile Device Datastore 300 are data groups used by routines and are discussed further herein in the discussion of other of the Figures.

The data groups used by routines illustrated in FIG. 3 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, joins, conditional logic, tests, and similar. In addition to the data groups used by routines illustrated in FIG. 3, login credentials and local instances of customer and user profiles may be stored in or be accessible to all of the computing devices illustrated in FIG. 1, such as in the Mobile Device Datastore 300, the Location Server 140, the Destination Server 120, and the Third Party Server 130.

The software routines and data groups used by the software routines may be stored and/or executed remotely relative to any of the computers through, for example, application virtualization.

FIG. 4 is a flowchart illustrating a routine practiced by a Geo-Fence Watcher process. At step 405, the Mobile Device 200 is executing a location service or is communicating with another computer which is executing a location service relative to the Mobile Device 200. The location service, for example, may, among other functions, chart the progress of the Mobile Device 200 relative to a Destination 110 and/or Geo-Fences along a route, such as Route 365, to the Destination 110. At step 410, the Mobile Device 200 gets the then-current location of the Mobile Device 200, such as by processing signals received from the GPS 140 satellites or from a Terrestrial Location Determining Service, which may be saved at this step in the Current Location 320 record, and of a Destination 110, which may be saved at this step in the Destination 315 record. The then-current location may be obtained by processing GPS signals or from a Terrestrial Location Determining Service. The Terrestrial Location Determining Service may be provided by the Location Server 140 and/or by the Mobile Device 200 triangulating its own position based on radio-frequency signals received from Environmental TX 160 sources and the TX-Emitter Coordinate 355 records in the Mobile Device Datastore 300. The Destination 110 location may be input by the user of the Mobile Device 200 and/or by a routine executed by the Mobile Device 200 or a remote computing device. For example, a user may be traveling to a hardware store; a location aware service may provide the user or an application being executed by the Mobile Device 200 with the location of several hardware stores (whether owned by one entity or several). One or more of the hardware store locations may be entered as the Destination 315. A route from the Current Location 320 to the Destination may also be obtained at this step, such as from the Location Server 140 or another source, which route may be stored in the Route 365 record. Geo-Fences may also be obtained at this step in a similar manner and/or Geo-Fences may be determined by identifying one or more perimeters relative to a Destination (such as half-way along the current Route 365, such as one mile from the Destination, or similar). Geo-Fences may be determined dynamically as the Mobile Device 200 moves toward the Destination 110. The Geo-Fences may be stored in the Geo-Fence Location 330 record. The Geo-Fence Location 330 records may have an order relative to or in, for example the Route 365 or relative to proximity and direction of travel of the Mobile Device 200, which order may be saved in or associated with the Geo-Fence Location 330 records.

Steps 415 through 465 iterate until the Mobile Device 200 obtains the Destination 110. At step 500, illustrated further in FIG. 5, if there have been no previous iterations, Location A 305 is set to be equal to the Current Location 320, the Prior Check Time 345 record is set to be equal to the then-current time, and the Determine Time of Next Check 500 routine determines the Time of Next Check 325 record. Then, or if there have been previous iterations of the loop between 415 and 465, the process proceeds to step 420.

At step 420, the process counts down to the time in the Time of Next Check 325 record. Steps 425 through 430 iterate until the Time of Next Check 325 occurs. At step 600, illustrated further in FIG. 6, the Time Correction 600 subroutine makes corrections to the Time of Next Check 325 record. At step 435, the Time of Next Check 325 occurs and the then-current location is obtained and Location B 310 is set equal to the then-current location.

At step 440, the speed between Location A 305 and Location B 310 is determined and stored as the Speed 340 record; the speed between the Locations may be based on a straight-line distance or on a distance between the locations along a route, such as Route 365. At step 445, the error between Location B and the Geo-Fence Location 330 may be determined and saved in the Error 360 record. Error 360 may be stored in association with a location or Route 365, with components of a Route 365, time of day, and day of year information. The Error 360 and associated records, such as speed along the Route 365, may transmitted to and received from others, including to, through, or via the Location Server 140.

At step 450, Location A 305 is set to be equal to Location B and the Prior Check Time 345 is set to be equal to the then-current time. At step 455, the next Geo-Fence Location 330 is obtained; the Destination 315 may be the next Geo-Fence Location 330. At step 460 the Time to Next Geo-Fence 335 is calculated at the Speed 340 and the Time of Next Check 325 record is set to be equal to the sum of the Prior Check Time 345 (or the then-current time) plus the Time to Next Geo-Fence 335 record. The process may then iterate between 415 and 465 until Location A 305 (and/or the Current Location 320 or the then-current location) equals the Destination 315.

At step 470, when Location A equals the Destination 315 (or is within a threshold distance of the Destination 315), a content flag or setting, such as in the Mobile Device 200, the Location Server 140 and/or the Third Party Server 130 may be set to indicate that the Mobile Device 200 is at and/or within the Destination 315, which flag or setting may indicate that the Mobile Device 200 is to be sent Content (including advertisements) relating to or associated with the Destination 315. In addition, a flag or setting may be set to indicate that the Mobile Device 200 is to use a Terrestrial Location Determining Service, such as may be provided by Location Server 140 and/or the Destination Server 120, rather than the GPS service. At step 499 the process may conclude.

Figure 5:
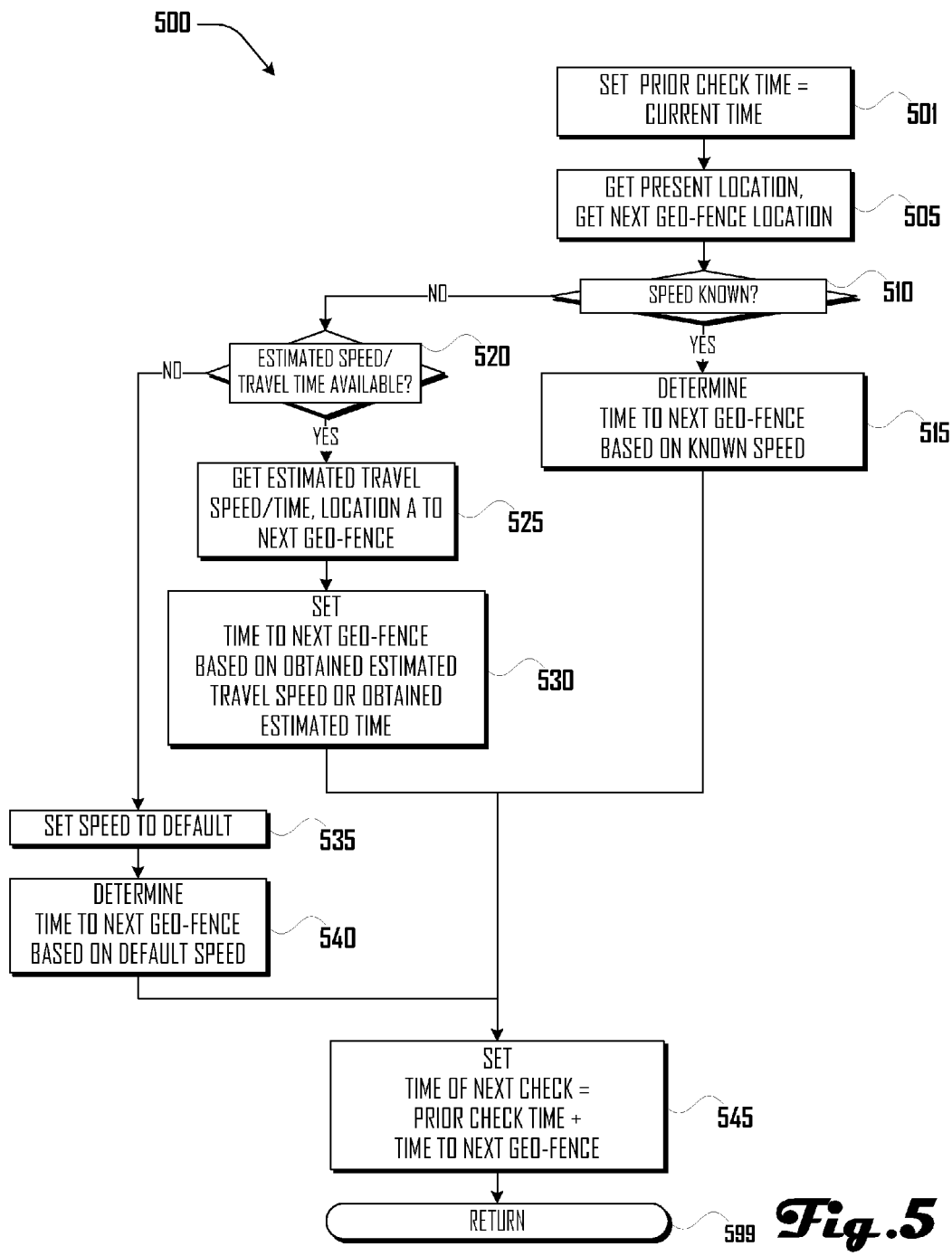
FIG. 5 is a flowchart illustrating a subroutine of a Determine Time of Next Check On First Iteration process, practiced within the routine illustrated in FIG. 4.

FIG. 5 is a flowchart illustrating a subroutine of a Determine Time of Next Check On First Iteration process, practiced within the routine illustrated in FIG. 4. At step 501, the Prior Check Time 345 record may be set to be equal to the then-current time. At step 505, the then-current location of the Mobile Device 200 may be obtained, such as from the Current Location 320 record. The Location A 305 record may be set to be equal to the Current Location 320 record (or to the then-current location of the Mobile Device 200). The next Geo-Fence Location 330 may also be obtained, wherein the determination of "next" may be based on the order of the Geo-Fence Location 330 records relative to or in the Route 365. As noted, the next Geo-Fence Location 330 may be the Destination 315 and/or a distance determined relative to the Destination 315 (which distance may be relative to the Route 365). At step 510 (which, as other of the steps, may be optional), a determination may be made regarding whether the then-current speed of the Mobile Device 200 is known, such as from a computer in a car within which the Mobile Device 200 may be located or from vector and speed information obtained in conjunction with obtaining the then-current location at step 410. The known speed may be stored in the Speed 340 record. At step 515, the process may then determine the time to the next Geo-Fence Location 330 based on the known speed, as may be found in the Speed 340 record, which time may be stored in the Time to Next Geo-Fence 335 record. The time to the Next Geo-Fence Location 330 based on the known speed may be along the Route 365 or may assume, for example, a straight-line distance between the Current Location 320 and the Next Geo-Fence Location 330.

If there was no step 510 or if the known speed was not available at step 510, then at step 520 a determination may be made regarding whether an estimated speed or travel time is available for Location A 305 to the next Geo-Fence Location 330. An estimated speed or travel time may be available, for example, from the Location Server 140. The estimated speed or travel time may be based on, for example, historical speed or travel time records from the user or from other users in conjunction with contemporaneous speed or congestion records. The estimated speed or travel time may be relative to the Route 365. At step 525, the estimated speed was determined to be available and is obtained and stored, for example, in the Speed 340 record. At step 530, the time to the next Geo-Fence Location 330 from Location A 305 may be determined based on the estimated speed; the determined time may be stored, for example, in the Time to Next Geo-Fence 335 record. Alternatively, at step 525, the estimated travel time was available and obtained and, at step 530, the estimated travel time may be stored, for example, in the Time to Next Geo-Fence 335 record.

At step 535, if no estimated speed or travel time was available at step 520 (or if step 520 was not performed), then the Speed 340 record may be set to a default value, such as a programmed default value, a determined average speed of the Mobile Device 200 or of other mobile devices, or similar. At step 540, the Speed 340 may be utilized to determine the time to the next Geo-Fence Location 330 from Location A 305; the determined time may be stored, for example, in the Time to Next Geo-Fence 335 record.

At step 545, the Time of Next Check 325 record may be set to be equal to the value of the Prior Check Time 345 record (or the then-current time) plus the value of the Time to Next Geo-Fence 335 record. At step 599, the Determine Time of Next Check 500 subroutine may return to the Fence Watcher 400 routine.

Figure 6:
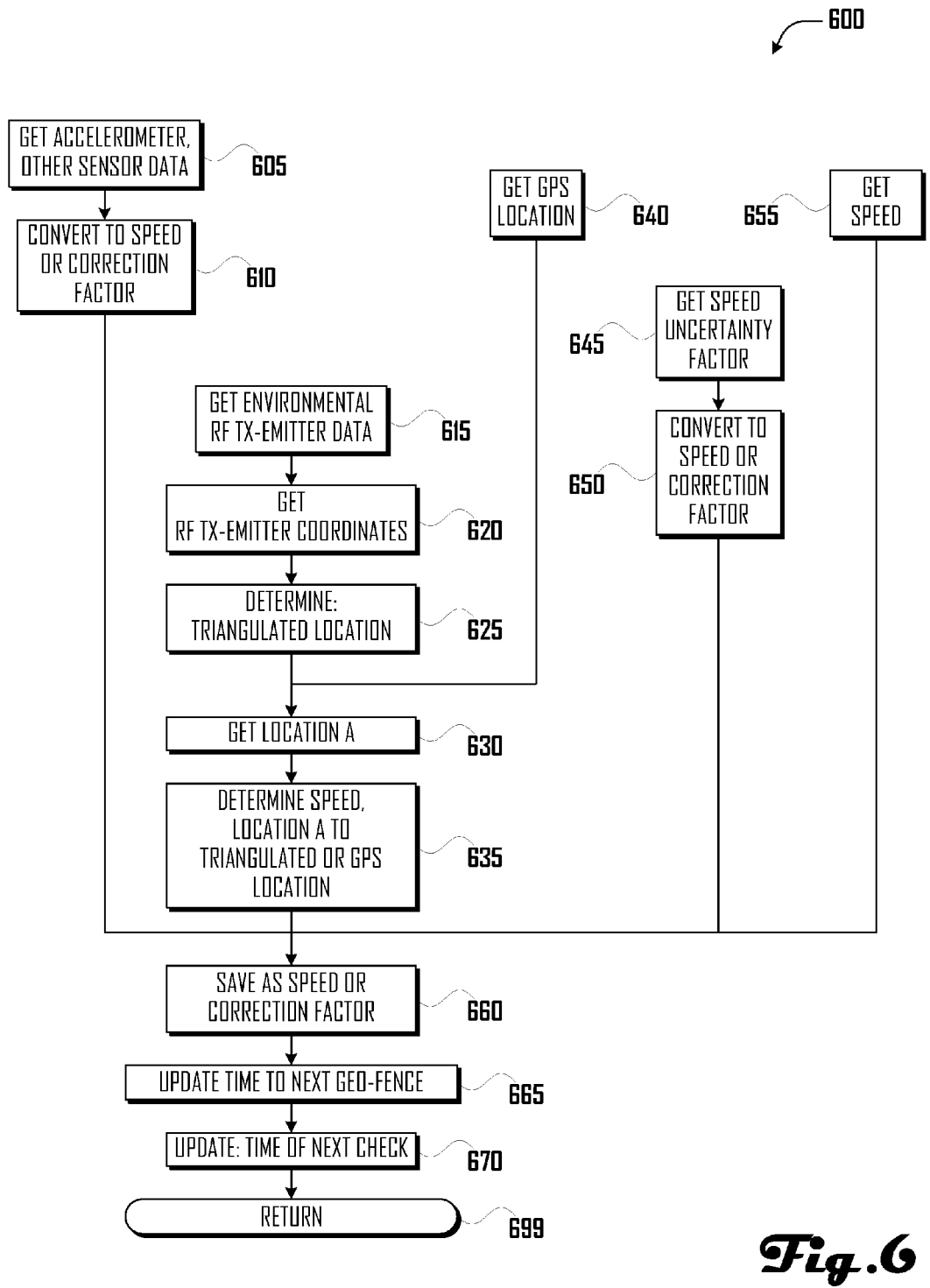
FIG. 6 is a flowchart illustrating a subroutine of a Time Correction process, practiced within the routine illustrated in FIG. 4.

FIG. 6 is a flowchart illustrating a subroutine of a Time Correction process, practiced within the routine illustrated in FIG. 4. The Time Correction 600 process is a routine which attempts to correct the Time of Next Check 325 record based on available information. The Time Correction 600 routine is meant to illustrate examples.

Steps 605, 615, 640, 645 and 655 are different starting points for the Time Correction 600 routine; these different starting points may be initiated independently; these different starting points are not exclusive.

At step 605, accelerometer and other sensor data, such as compass data, may be obtained by the Mobile Device 200 from its own Input 245. At step 610, the sensor data may be converted into a speed, change in speed, or into a speed correction factor. For example, the sensor data may indicate that the Mobile Device 200 has accelerated or decelerated. An integral or another mathematical function or algorithm may convert the sensor data into a speed value, a change in speed value or into a correction factor. The change in speed may be computed relative to a direction. By way of another example, the sensor data may indicate that the Mobile Device 200 is not moving or is not engaged in gross motion (per FIG. 7).

At step 615, environmental radio-frequency signals may be received by the Mobile Device 200 from Environmental TX 160 sources. At step 620, the Mobile Device 200 may use identifiers in the environmental radio-frequency signals to look up the Environmental TX 160 sources in the TX-Emitter Coordinate 355 records in the Mobile Device Datastore 300. At step 625, the Mobile Device 200 may then triangulate its own position based on the TX-Emitter Coordinate 355 records in the Mobile Device Datastore 300. At step 630, the Mobile Device may get Location A 305 and then, at step 635, may determine the speed from Location A 305 to the triangulated position determined at step 625 or the GPS location determined at step 640. These steps may be performed by or in conjunction with a third party, such as Location Server 140.

At step 640, the Mobile Device 200 may obtain GPS signals and may convert this into a location and/or into a speed and vector.

At step 645, a speed uncertainty or other uncertainty factor may be obtained or determined. The uncertainty factor may be a default setting, may be based on or derived from Error 360 records of the Mobile Device 200, on similar records from other mobile devices, on an uncertainty factor related to the Route 365, to the time of day, and/or to the time of year. The uncertainty factor may be converted at step 650 into a corrected speed, change in speed, or a correction factor.

At step 665, a known speed of the Mobile Device 200 may be obtained, such as from a computer associated with a car in which the Mobile Device 200 may be traveling (and with which the Mobile Device 200 may be coupled) or from an external location service, as may be provided by the Location Server 140.

At step 660, the determined speed may be saved in the Speed 340 record or the determined correction factor may be saved. At step 665, the Time to Next Geo-Fence 335 record may be updated based on the speed or correction factor from step 660. By way of example, the correction factor may increase the Time to next Geo-Fence 335 record if the Mobile Device 200 was determined to have slowed down or if the Mobile Device 200 was determined to have stopped moving. The correction factor may toll the Time to Next Geo-Fence 335 until the Mobile Device 200 is detected to start moving again. At step 670, the Time of Next Check 325 record may be updated, based on the updated Time to Next Geo-Fence 335 record.

FIG. 7 is a flowchart illustrating a subroutine of a Probe Throttle process, practiced while another location aware routine is being executed. Steps 705 to 750 indicate that this process may be iterated while another routine is being executed, such as a location aware routine. At step 710, the Mobile Device 200 obtains sensor data, such as data from accelerometers, compass(es), magnetometers, air pressure sensors, and other sensors which may be on the device generally represented by Input 245. At step 715, the sensor data is converted into gross motion. Gross motion is motion of the Mobile Device 200 which results from movement of the user across an area (also referred to as gross motion of the user), which motion results in movement of the Mobile Device 200, rather than motion of the Mobile Device which may be independent of gross motion of the user. This conversion may be performed, for example, by identifying cyclic, short duration acceleration which, if netted over a short period, cancels. At step 720 a determination may be made regarding whether gross motion of the Mobile Device 200 was detected. At step 725, no gross motion of the Mobile Device 200 was detected at step 720, so a command, flag, setting, or similar is issued or set to indicate to the Mobile Device 200 and other routines executed on the Mobile Device 200 that it or they should not probe the location of the Mobile Device 200, such as that the Mobile Device 200 should not check its location with GPS or a Terrestrial Location Determining Service. At step 730, the Probe Throttle 700 routine may, optionally, provide an output indicating that the Mobile Device 200 is not experiencing a change in location.

At step 735, gross motion of the Mobile Device 200 was determined to have occurred at step 720 and a command, flag, setting, or similar is issued or set to indicate to the Mobile Device 200 and other routines executed on the Mobile Device 200 that it or they may probe the location of the Mobile Device 200, such as that the Mobile Device 200 may check its location with GPS or a Terrestrial Location Determining Service. At step 740, the location of the Mobile Device 200 may be determined based on the gross motion determined at step 715, which determined location may be output at step 745.

The above Detailed Description of embodiments is not intended to be exhaustive or to limit the disclosure to the precise form disclosed above. While specific embodiments and examples are described above for illustrative purposes, various equivalent modifications are possible within the scope of the system, as those skilled in the art will recognize. For example, while processes or blocks are presented in a given order, alternative embodiments may perform routines having operations, or employ systems having blocks, in a different order, and some processes or blocks may be deleted, moved, added, subdivided, combined, and/or modified. While processes or blocks are at times shown as being performed in series, these processes or blocks may instead be performed in parallel, or may be performed at different times. Further, any specific numbers noted herein are only examples; alternative implementations may employ differing values or ranges.

The invention claimed is:

1. A method performed in a mobile computer device comprising a memory, the method comprising:
   obtaining a present location from a location service and a destination;
   controlling a frequency with which the mobile computing device obtains location information from the location service by:
   i) setting:
      a location A to be the present location,
      a prior check time as a then-current time, and
      determining a first time when the location of the mobile device will next be checked based on the present location, a next most proximate geo-fence perimeter relative to the destination, and an expected speed;
   ii) counting down from the prior check time to the time of the next location check and, while counting down from the prior check time to the time of the next location check, correcting the time of the next location check based at least in part on a determination regarding whether an internal accelerometer sensor data indicates gross motion of a user of the mobile computing device across an area or whether the internal accelerometer sensor data indicates movement of only the mobile computing device;
   iii) at the time of the next location check, obtaining a location B from the location service;
   iv) determining a speed for the distance traveled between location A and location B;
   v) setting location A to be equal to location B and setting the prior check time as the then-current time;
   vi) updating the next most proximate geo-fence perimeter;
   vii) determining a time to the next most proximate geo-fence perimeter at the determined speed;
   viii) setting the time of next location check to be equal to the prior check time plus the determined time to the next most proximate geo-fence perimeter; and
   ix) iterating steps i) to vii) until location A is proximate to the destination.

2. The method according to claim 1, wherein the next most proximate geo-fence perimeter is one of a set of geo-fence perimeters.

3. The method according to claim 1, wherein the next most proximate geo-fence perimeter is the same as the destination.

4. The method according to claim 1, wherein the next most proximate geo-fence perimeter is a distance from the destination.

5. The method according to claim 1, wherein the next most proximate geo-fence perimeter is the next most proximate geo-fence perimeter in a direction of travel.

6. The method according to claim 1, wherein the next most proximate geo-fence perimeter is the next most proximate geo-fence perimeter along a route between the present location and the destination.

7. The method according to claim 1, wherein correcting the time of the next location check comprises correcting based on an uncertainty factor.

8. The method according to claim 7, further comprising, after determining a speed for the distance traveled between location A and location B, determining an error between a previously expected value of location B or an previously expected speed between location A and location B in a prior iteration and an actual value of location B or an actual speed as measured in a then-present iteration, wherein the error is used as or to derive the uncertainty factor.

9. The method according to claim 8, wherein the error is associated with at least one of a route, a time of day, a day of the week, and a day in a year.

10. The method according to claim 8, further comprising communicating to a third party the error between the expected value of location B or the expected speed between location A and location B and the actual value of location B or the actual speed as measured in the then-present iteration.

11. The method according to claim 8, further comprising receiving from a third party an error corresponding to the error between the expected value of location B or the expected speed between location A and location B and the actual value of location B or the actual speed as measured in the then-present iteration.

12. The method according to claim 1, wherein correcting the time of the next location check comprises triangulating the location of the mobile computer device based on environmental radio-frequency signals, getting the location A, determining the speed between the location A and the location of the mobile computer device according to the triangulated location, determining the time to the geo-fence perimeter based on the determined speed, and setting the time of the next location check to be equal to the prior check time plus the determined time to the geo-fence perimeter based on the determined speed.

13. The method according to claim 1, wherein correcting the time of the next location check comprises converting the internal accelerometer sensor data into a correction factor and correcting the time of the next location check utilizing the correction factor.

14. The method according to claim 1, wherein the expected speed comprises an average travel time along an anticipated route between the present location and the destination, wherein the average travel time is determined by a group of mobile computer devices.

15. The method according to claim 1, further comprising, when location A is proximate to the destination, setting a content indicator to indicate that the mobile device is proximate to the destination.

16. The method according to claim 15, wherein the content indicator is transmitted to a server computer, wherein the server computer selects content to be transmitted to the mobile computer device.

17. The method according to claim 16, wherein the content comprises advertisements associated with products or services available at the destination.

18. The method according to claim 1, further comprising, when the location A is proximate to the destination, setting the mobile computing device to utilize a terrestrial location determining service.

19. One or more computer readable media comprising instructions that cause a computing device, in response to execution of the instructions by one or more processors of the computing device, to:
control a frequency with which the computing device obtains a location from a location service by:
i) setting:
a location A to be a present location,
a prior check time as a then-current time, and
determine a first time when the location of the mobile device will next be checked based on the present location, a next most proximate geo-fence perimeter relative to a destination, and an expected speed;
ii) counting down from the prior check time to a time of the next location check and, while counting down from the prior check time to the time of the next location check, correcting the time of the next location check based at least in part on a determination regarding whether an internal accelerometer sensor data indicates gross motion of a user of the mobile computing device across an area or whether the internal accelerometer sensor data indicates movement of only the mobile computing device;
iii) at the time of the next location check, obtaining a location B from the location service;
iv) determining a speed for a distance traveled between location A and location B;
v) setting location A to be equal to location B and setting the prior check time as the then-current time;
vi) updating the next most proximate geo-fence perimeter;
vii) determining a time to the next most proximate geo-fence perimeter at the determined speed;
viii) setting the time of the next location check to be equal to the prior check time plus the determined time to the next most proximate geo-fence perimeter; and
ix) iterating steps i) to vii) until location A is proximate to the destination.

20. A method performed in a mobile computing device comprising a memory, the method comprising:
obtaining accelerometer sensor data from sensors in the mobile computing device;
determining whether the accelerometer sensor data indicates gross motion of a user of the mobile computing device across an area or whether the accelerometer sensor data indicates movement of only the mobile computing device, and
when the accelerometer sensor data indicates gross motion of the user of the mobile computing device,
permitting location probes by the mobile device;
when the sensor data indicates movement of only the mobile computing device, disabling location probes by the mobile device.

* * * * *